United States Patent [19]

Le Roux

[11] Patent Number: 5,590,193
[45] Date of Patent: Dec. 31, 1996

[54] METHOD TO SECURE THE OPERATIONS FOR ACCESSING DETACHABLE CARDS FOR COMPUTERS

[75] Inventor: Jean-Yves Le Roux, Ceyreste, France

[73] Assignee: Gemplus Card International, Gemenos Cedex, France

[21] Appl. No.: 434,531

[22] Filed: May 4, 1995

[30] Foreign Application Priority Data

May 5, 1994 [FR] France ................................. 94 05552

[51] Int. Cl.$^6$ ........................................... H04L 9/00
[52] U.S. Cl. .................. 380/4; 395/188.01; 235/492; 235/382
[58] Field of Search .................................... 380/4

[56] References Cited

U.S. PATENT DOCUMENTS

| | | | |
|---|---|---|---|
| 4,120,030 | 10/1978 | Johnstone | 364/200 |
| 4,306,289 | 12/1981 | Lumley | 364/200 |
| 4,453,074 | 6/1984 | Weinstein | 235/380 |
| 4,633,388 | 12/1986 | Chiu | 364/200 |
| 4,891,838 | 1/1990 | Faber | 380/25 |
| 4,947,318 | 8/1990 | Mineo | 364/200 |
| 5,012,514 | 4/1991 | Renton | 380/4 |
| 5,027,396 | 6/1991 | Platteter et al. | 380/4 |
| 5,034,980 | 7/1991 | Kubota | 380/4 |
| 5,081,675 | 1/1991 | Kittirutsunetorn | 380/4 |
| 5,095,525 | 3/1992 | Almgren et al. | 395/400 |
| 5,212,729 | 5/1993 | Schafer | 380/4 |
| 5,313,520 | 5/1994 | Han | 380/4 |
| 5,343,525 | 8/1994 | Hung et al. | 380/4 |
| 5,357,573 | 10/1994 | Walters | 380/25 |
| 5,371,793 | 12/1994 | Kimura | 380/4 |
| 5,375,243 | 12/1994 | Parzych et al. | 395/725 |
| 5,394,469 | 2/1995 | Nagel et al. | 380/4 |
| 5,448,045 | 9/1995 | Clark | 235/382 |
| 5,469,564 | 11/1995 | Junya | 395/188.01 |
| 5,471,045 | 11/1995 | Geronimi | 235/492 |
| 5,475,762 | 12/1995 | Morisawa et al. | 380/25 |
| 5,490,216 | 2/1996 | Richardson, III | 380/4 |
| 5,495,531 | 2/1996 | Smiedt | 380/4 |
| 5,499,295 | 3/1996 | Cooper | 380/23 |

*Primary Examiner*—Thomas H. Tarcza
*Assistant Examiner*—Hrayr A. Sayadian
*Attorney, Agent, or Firm*—Nilles & Nilles, S.C.

[57] ABSTRACT

A method for securing access to detachable cards of the mass storage or I/O type using a password to encipher the address of the configuration register placed in the descriptor of the card, which descriptor is stored in a non-volatile memory of the card. The method prevents a computer from configuring the card unless a correct password is provided.

7 Claims, 1 Drawing Sheet

METHOD TO SECURE THE OPERATIONS FOR ACCESSING DETACHABLE CARDS FOR COMPUTERS

BACKGROUND OF THE INVENTION

1. Field of the Invention

The invention relates to a method to secure the operations for accessing detachable cards for computers. It can be applied to mass storage cards for microcomputers or personal computers (PCs) and to cards having an input/output function. It can be applied especially to cards meeting the PCMCIA standard.

2. Description of the Prior Art

Mass-storage-cards, which are sometimes also called PC cards, comprise several memory chips and a connector (a 68-pin female connector according to the PCMCIA standard of the Personal Computer Memory Card International Association, 1030B East Duane Avenue, Sunnyvale, Calif.). The card can be plugged into a corresponding (male) connector of the computer. The connections are such that the memory can be addressed by a parallel input-output port of the PC, either as if the memory were a magnetic mass storage memory or as if it were an extension of the random-access memory of the computer.

Apart from mass storage cards, there also exist cards for personal computers that have the functions of communication between the computer and the exterior, and therefore comprise not only a connector designed to provide the link with the personal computer but also means of connection with the exterior. These cards are called input/output function cards, or I/O function cards. The typical example of a card with a communications function is the modem which is connected by a first connector to the computer and by a second connector to a telephone line for the sending of digital data elements on the line. Another example of a card with a communications function is a card for local area networks where communications with the exterior are carried out not by a connector with physical contacts but by RF transmission in a close environment.

The existing communications cards generally use the RS232C output of the computers which delivers digital data in serial form, well suited to communication by modem or by radio. Or, again, the cards are directly mounted inside the computer and do not take the form of plug-in cards.

There furthermore exist communication cards that can be plugged into the memory extension connector provided in many computers. This connection is made without there appearing any problem of communications protocol. The description of such a card will be found in the French patent application No. 92 08554 published under No. 2 693 575.

The technical problem that the applicant has sought to resolve is that of protecting the operations of accessing such cards by computer in modifying the electronic circuitry of these cards as little as possible and, more specifically, in keeping standard cards. The protection system thus costs as little as possible.

SUMMARY OF THE INVENTION

An object of the present invention is a method for the securing of the operations for accessing the mass storage type cards or input-output function cards connected to a computer, these cards comprising a descriptor or CIS (Card Information Structure) designed to contain information elements for the recognition of the card and of the configuration, enabling the computer to use the card for the application in which it is defined, wherein said method comprises a stage of customization of the card during which at least one information element of the descriptor is enciphered by means of an enciphering function f and a password assigned to one or more authorized users, wherein during subsequent uses the user presents his password and wherein the operating system of the computer activates a reading of the descriptor and the performance of a function $f^{-1}$ for the deciphering of the information elements read in the descriptor on the basis of the password entered by the user so as to determine the enciphered information.

BRIEF DESCRIPTION OF THE DRAWING

The present invention shall be understood more clearly from the following description, made by way of a non-restrictive and illustrative example, with reference to the figures of which.

MORE DETAILED DESCRIPTION

The invention is applicable to cards meeting the PCMCIA standard, these cards being of the input/output memory card type (for example for modems, networks or pages) or mass storage card type.

Software layers of the PCMCIA standard enable a PC type computer to automatically recognize the PCMCIA card that has just been inserted and configure it appropriately with respect to its own resources, namely its memory spaces and its inputs/outputs. To this end, reference could be made to the document "PCMCIA Socket Services Interface Specification" distributed by the "Personal Computer Memory Card International Association".

The recognition of the card is done by the reading of the descriptor of the card. The descriptor or CIS (Card Information Structure) defines the type of card, its electrical and dynamic characteristics, its available and configurable input/output spaces.

The descriptor D indeed comprises two types of information elements. It has general information elements IG defining the type of card, namely whether it is a memory card or an input/output card (modem card or network card), the date of manufacture, the card number and the manufacturer's name.

The general information elements also define the electrical and dynamic characteristics of the card. These characteristics notably include the minimum and maximum supply voltages, the non-volatile memory programming voltage, the current for reading the card and the access time.

The descriptor furthermore comprises a region of configuration information elements IC. These information elements correspond to working parameters that are indispensable for the computer and the card to cooperate in a manner that is transparent to the user. This region thus comprises an information field L defining the length of the data exchange buffer, an address field of the configuration register in which the configuration data element defined by the computer at each installation of the card must be installed and a field I defining the interruptions, namely the means of exchange between the card and the computer.

Figure 1:
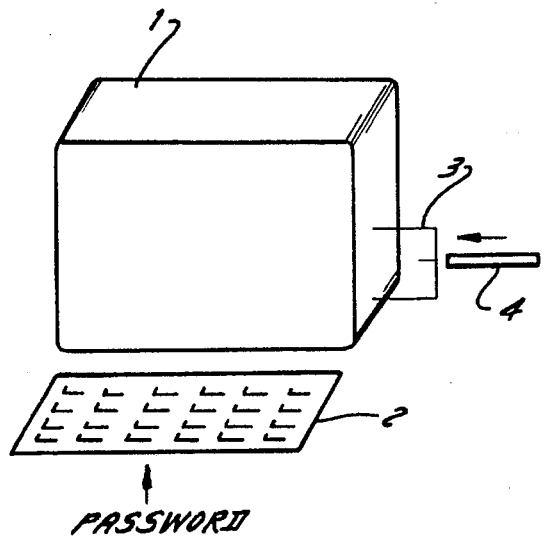
FIG. 1 is a drawing of a system implementing the method according to the invention.
Figure 2:
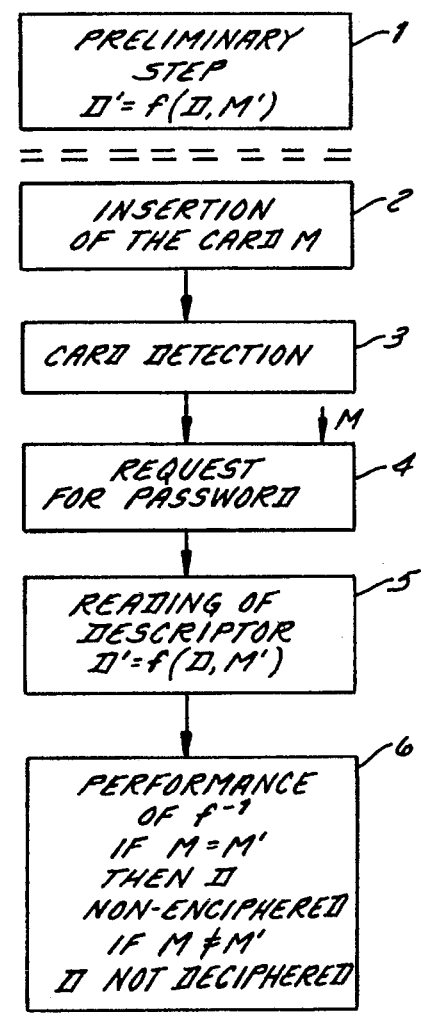
FIG. 2 shows the main steps of the method according to the invention.
Figure 3:
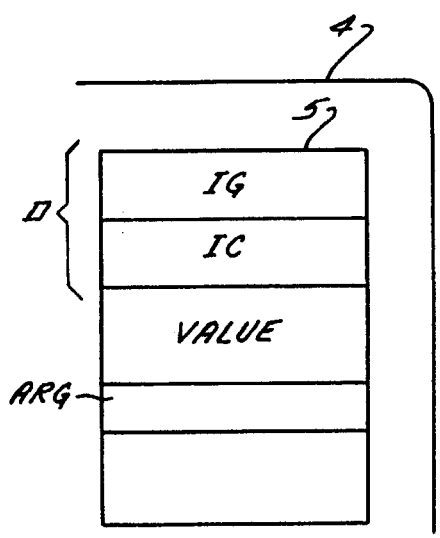
FIG. 3 shows the location of the descriptor on the card.
Figure 4:
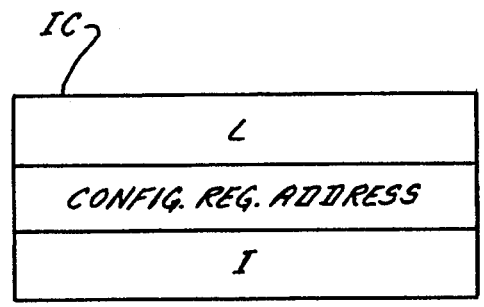
FIG. 4 shows the region containing the information elements relating to the configuration of the descriptor of the card.

When a user inserts a card 4 into the reader 3 (socket) of the computer 1, the computer detects the presence of the card (in a known way, for example by the detection of a voltage level on the link) and sends a signal for the reading of the non-volatile memory 5 in which there is recorded the descriptor D of the card in order to obtain knowledge of the general information IG on the card and the configuration information elements to enable the configuration of the card. Reference could be made to the diagrams of FIGS. 1, 3 and 4, for a clearer understanding of the description that has just been made, as well as to the drawing of FIG. 2 for the rest of the description.

According to the invention, before the customization of the card, i.e. before any use, the descriptor is enciphered on the basis of a known enciphering function using a predetermined password M' reserved for one authorized user or for several authorized users.

The enciphering function f chosen will be, for example, an enciphering algorithm such as the DES (Data Encryption Standard) algorithm.

It is thus possible to encipher all or a part of the descriptor. According to a preferred embodiment, it has been chosen to encipher a configuration information element. More specifically, according to this preferred example, the information element indicating the address of the configuration register ARG is enciphered.

The address field of the configuration register gives the address at which the configuration data element must be installed. This data element itself could, for example, be a memory address.

The address at which the configuration data element has to be installed is enciphered by the password M'. Thus, when a user inserts a card and does not know the password, the computer cannot know the address of the configuration register and therefore cannot configure the card.

Indeed, according to the method, when the descriptor D or a part of the information elements of the descriptor have been enciphered with the password M' of the user or users, $D'=f(D,M')$ (step 1, FIG. 2), at each insertion of the card (step 2, FIG. 2) the user must present his password (step 4). For this purpose, he types out the password on the keyboard of the computer. The computer then launches the performance of the deciphering function $f^{-1}$ (which is the reverse of the function used for the enciphering) with the password entered by the user. If this password is the same as the one used for the enciphering, the computer obtains the value of the address in non-enciphered form and can carry out the installation, at the address indicated, of the configuration data element for the application launched by the user (step 6).

Thus, all access to the card is protected so long as the correct password has not been entered. This modification is obtained without any modification of the hardware (namely the electronic circuitry).

The activating of an application entailing the use of a mass storage card or an input/output card includes a request that consists in asking for the password. This is followed by the reading of the descriptor and the performance of the deciphering function.

Preferably, the enciphered descriptor will be memorized in an electrically erasable non-volatile memory (EEPROM) 4. Thus, it will be possible to modify the password if the need arises. All that needs to be done then is to to re-record the new enciphered data elements of the descriptor instead of the former enciphered data elements in carrying out a simple erasure of this memory and a new writing of the descriptor.

What is claimed is:

1. A method for securing the accessing of a mass storage type card or input-output function type card connected to a computer, these cards comprising a descriptor designed to contain information elements for recognizing the card and its configuration, enabling the computer to use the card for an application, wherein said method comprises a stage of customization of the card during which at least one information element of the descriptor is enciphered by means of an enciphering function f using a password assigned to one or more authorized users, wherein during subsequent uses the user presents his password and, wherein the operating system of the computer activates a reading of the descriptor and the performance of a function $f^{-1}$ for the deciphering of the information elements read in the descriptor on the basis of the password entered by the user so as to determine the enciphered information.

2. A securing method according to claim 1, wherein the descriptor comprises fields of general information elements on the card and fields of configuration information elements.

3. A securing method according to claim 2 wherein, among the fields of configuration information elements, the descriptor comprises a field giving the address at which the configuration data element must be installed and wherein the enciphered information element is this address.

4. A securing method according to claim 1, wherein the descriptor of the card is stored in a non-volatile memory.

5. A securing method according to claim 4, wherein the memory is an electrically erasable memory (EEPROM).

6. A securing method according to claim 1, wherein the cards are mass storage cards and/or input/output cards.

7. A securing method according to claim 1, wherein the cards are cards meeting the PCMCIA standard.

* * * * *